United States Patent [19]
Giles et al.

[11] Patent Number: 6,043,915
[45] Date of Patent: *Mar. 28, 2000

[54] STABILIZATION OF A MULTI-CHANNEL OPTICAL SIGNAL TRANSMITTER THROUGH CORRELATION FEEDBACK

[75] Inventors: Clinton Randy Giles, Morganville; Martin Zirngibl, Middletown, both of N.J.

[73] Assignee: Lucent Technologies Inc., Murray Hill, N.J.

[ * ] Notice: This patent is subject to a terminal disclaimer.

[21] Appl. No.: 08/823,038

[22] Filed: Mar. 31, 1997

[51] Int. Cl.⁷ .............................. H04J 14/02; H04B 10/06
[52] U.S. Cl. ......................... 359/132; 359/133; 359/187
[58] Field of Search .................................. 359/124, 125, 359/127, 130, 132, 133, 187; 372/23

[56] References Cited

U.S. PATENT DOCUMENTS

| | | | |
|---|---|---|---|
| 5,745,275 | 4/1998 | Giles | 359/187 |
| 5,870,217 | 2/1999 | Itou et al. | 359/179 |

OTHER PUBLICATIONS

M. Zirngibl et al., "Demonstration of a 9×200 Mbit/s Wavelength Division Multiplexed Transmitter," Electronics Letters, vol. 30, pp. 1484–1485, Jul. 1994.

C.R. Doerr et al., "Elimination of Signal Distortion and Crosstalk from Carrier Density Changes in the Shared Semiconductor Amplifier of Multifrequency Signal Sources," IEEE Photonics Technology Letters, vol. 7, No. 10, pp. 1131–1133, Oct. 1995.

*Primary Examiner*—Leslie Pascal

[57] ABSTRACT

Methods and apparatus for stabilizing or otherwise controlling optical signal power levels in a multi-channel optical communication system. A multi-channel optical signal is detected in a single receiver, and the resulting detected signal is supplied to a correlator. The correlator correlates the detected multi-channel signal with a data signal associated with a particular channel to be controlled in order to generate a measure of the optical signal power of the particular channel. The measure is utilized in a feedback control loop to control an optical signal power level of the particular channel. The correlator may generate the measure of optical signal power by mixing the detected signal and the data signal in an RF mixer, by multiplying the detected signal and a data signal in the form of a unique identifier associated with the particular channel, or by using other suitable correlation techniques. A feedback control processor may be used to process the measure to generate a control signal which is applied to a current source generating current for the particular channel in a multi-frequency laser or other multi-channel optical source. The processor may sequentially monitor and control each of the multiple channels of the multi-channel optical signal using the same receiver and correlator.

22 Claims, 5 Drawing Sheets

STABILIZATION OF A MULTI-CHANNEL OPTICAL SIGNAL TRANSMITTER THROUGH CORRELATION FEEDBACK

FIELD OF THE INVENTION

The present invention relates generally to optical communication systems and more particularly to techniques for stabilizing or otherwise controlling optical signal power levels in multi-channel optical signal transmission systems.

BACKGROUND OF THE INVENTION

Multi-channel optical signal transmission systems typically monitor and control transmitted signal power level in each channel in order to correct for effects such as temperature change and device aging. Conventional monitor and control techniques are usually implemented locally at the transmitter and performed independently on each channel. For example, each of the channel signal transmitters in a multi-channel wavelength division multiplexed (WDM) laser transmitter may include a photodetector which monitors the rear facet light emitted by a semiconductor laser used to generate the corresponding channel signal. The photodetector output is then used in a feedback loop to control the output optical signal power level of the channel signal transmitter.

This conventional built-in independent channel control approach requires a separate optical detector and feedback control loop for each channel, and therefore increases the cost and complexity of the optical system. Moreover, integrated multi-channel laser transmitters may not be able to utilize such built-in independent channel control techniques, and may therefore require alternative techniques such as external detection. For integrated distributed feedback (DFB) laser arrays or integrated multi-frequency lasers, conventional techniques for monitoring the WDM channels may involve using an optical spectrometer to separate the channels or superimposing unique modulation tones over the data. Unfortunately, these external detection techniques also unduly increase the cost and complexity of the channel signal power control process.

It is therefore apparent that a need exists for an improved technique for stabilizing or otherwise controlling optical signal power levels in multi-channel optical signal transmitters.

SUMMARY OF THE INVENTION

The present invention provides methods and apparatus for controlling optical signal power levels in a multi-channel integrated laser transmitter or other multi-channel optical signal source. The invention involves correlating a detected multi-channel optical signal with a data signal of a particular channel in order to generate a measure of the optical signal power of that channel. The measure can then be utilized in a feedback control loop to adjust, stabilize or otherwise control the power level of that channel. Similar control is provided for other channels of the multi-channel signal by sequentially correlating the detected multi-channel signal with data signals of the other channels using the same receiver and correlator. In this manner, power level control may be provided for multiple channels of a multi-channel optical signal using only a single external receiver, correlator and feedback loop, and thus with substantially reduced cost and complexity relative to conventional techniques.

In accordance with one aspect of the invention, a multi-channel optical signal is detected in a single receiver, and the resulting detected signal is supplied to a correlator. The correlator correlates the detected multi-channel signal with a data signal associated with a particular channel to be controlled, in order to generate a measure of the optical signal power of the particular channel. As noted above, the measure is utilized in a feedback control loop to control an optical signal power level of the particular channel. The correlator may generate the measure of optical signal power by mixing the detected signal and the data signal of the particular channel in an RF mixer. For example, the detected signal may be supplied to an RF port of the mixer, and the data signal of the particular channel supplied to the LO port of the mixer. The mixer output voltage may then be used as the measure of the optical signal power in the particular channel. Alternatively, the measure of channel power level may be generated in a correlator which multiplies the detected multi-channel signal with a data signal in the form of a unique identifier associated with the particular channel to be controlled. The unique identifiers associated with the multiple channels of a given multi-channel optical signal may be selected such that the identifiers correspond to a set of orthogonal vectors. Each of the unique channel identifiers may also be configured to include an equal number of each of two binary logic levels, such that certain types of noise generated in the correlator will tend to cancel out. Other suitable correlation techniques may also be used to generate a measure of channel signal power for use with the correlation feedback power control techniques of the present invention.

In accordance with another aspect of the invention, a feedback control processor may be used to process the measure of channel power level to generate a control signal. The processor may apply the resulting control signal to a current source generating current for the particular channel in a multi-frequency laser or other multi-channel optical source. The processor may direct the monitoring and control of multiple channels of a given multi-channel optical signal by sequentially applying an appropriate data signal to the correlator and generating a corresponding control signal from the power level measure obtained for each of the multiple channels.

The correlation feedback techniques of the present invention provide improved channel signal monitoring and control in a variety of applications. For example, the performance of the invention is illustrated herein for an application in which eight channel signals are stabilized over temperature variations, using both NRZ and sequential RZ modulation types at a channel data rate of 50 Mbit/s. The exemplary performance measurements indicate that the present invention may be used to stabilize channel power levels over temperature variations for applications in which the channel data signals are independent as well as broadcast applications in which a common set of broadcast data is applied to each channel after a suitable decorrelation delay. These and other features and advantages of the present invention will become more apparent from the accompanying drawings and the following detailed description.

DETAILED DESCRIPTION OF THE INVENTION

The present invention will be illustrated below in conjunction with an exemplary optical system incorporating a multi-channel integrated laser transmitter. It should be understood, however, that the invention is not limited to use with any particular type of optical system or multi-channel signal source, but is instead more generally applicable to any optical system in which it is desirable to control power levels in multiple signal channels. The term "multi-channel transmitter" should be understood to include not only integrated laser transmitters such as multi-frequency lasers, but also any multi-channel optical signal source capable of generating multiple output optical signals at different wavelengths. A "channel signal" as the term is used herein is intended to include a signal component of a multi-channel WDM signal as well as a signal component of any other type of multi-channel optical signal. The term "control" in the context of feedback control includes stabilization as well as any other type of channel signal level adjustment.

Figure 1:
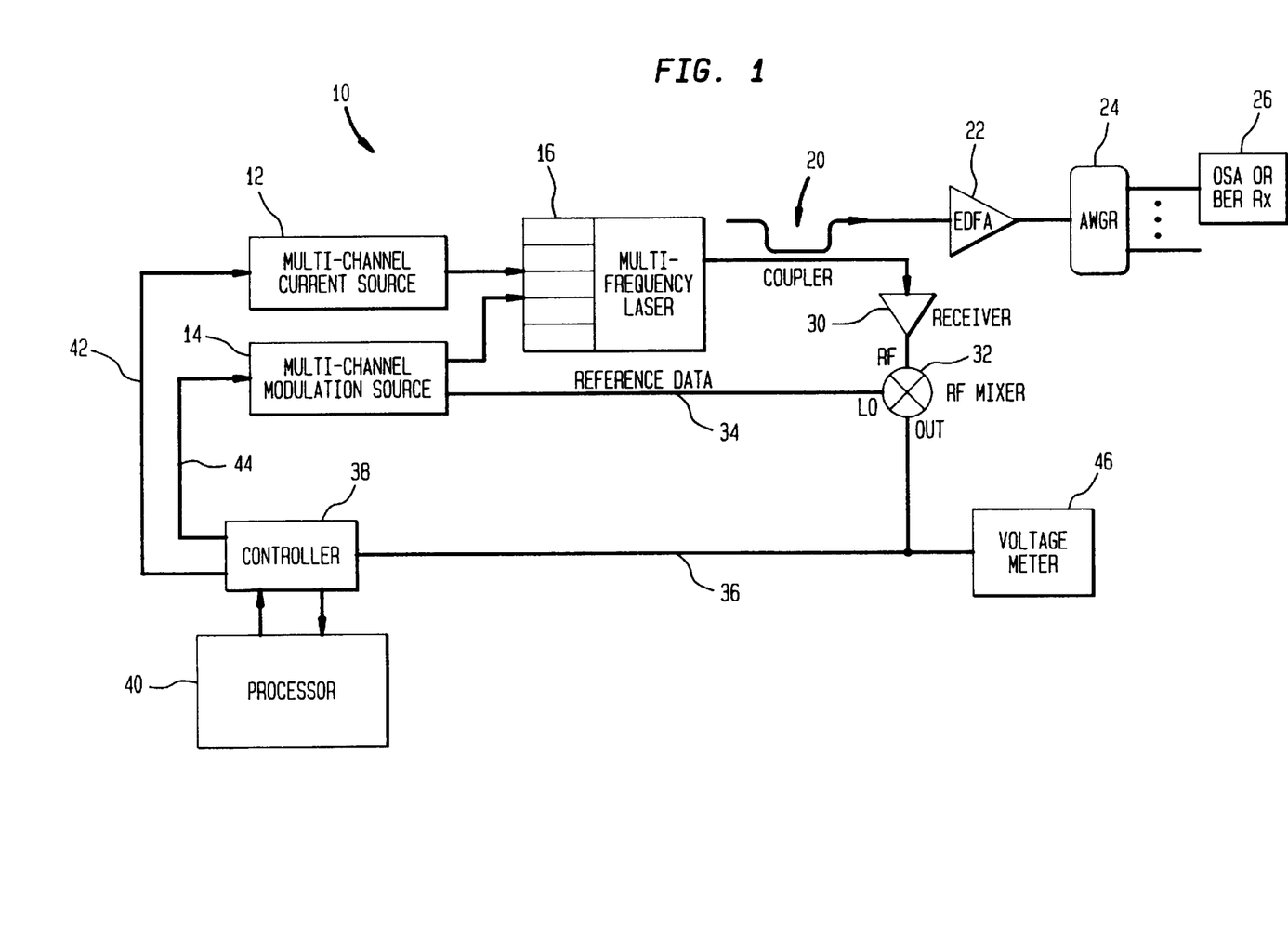
FIG. 1 shows an exemplary optical system configured to illustrate the operation of a multi-channel signal power control technique using correlation feedback in accordance with the present invention.

FIG. 1 shows an exemplary optical communication system 10 in accordance with the present invention. The system 10 includes a multi-channel current source 12 and a multi-channel modulation source 14, both of which drive corresponding inputs of a multi-frequency laser 16. The multi-frequency laser 16 may be, for example, an integrated N-channel 1550 nm InGaAsP laser with an arrayed-waveguide router, gain sections on each of the N channel ports, and a single common amplifier in the output port. The number of channels N may be on the order of 24. Such a multi-frequency laser is described in greater detail in M. Zirngibl et al., "Demonstration of a 9×200 Mbit/s Wavelength Division Multiplexed Transmitter," Electronics Letters, Vol. 30, p. 1484, 1994, which is incorporated by reference herein. The output optical signal power level for each of the channel signals generated in multi-frequency laser 16 is controlled by a corresponding current signal supplied by multi-channel current source 12. The modulation data for each of the channel signals is supplied to the multi-frequency laser 16 in the form of a data signal from the multi-channel modulation source 14. The output of the multi-frequency laser 16 is thus a multi-channel optical signal having a number of distinct channel signals each of which may be modulated by a corresponding data signal. The multi-channel optical signal passes through a coupler 20, is amplified in an erbium-doped fiber amplifier (EDFA) 22, and is applied to an arrayed-waveguide grating router (AWGR) 24. The AWGR 24 separates the multi-channel optical signal into separate channel signals, and the channel signals are then applied to an optical spectrum analyzer (OSA) or bit-error-rate (BER) receiver 26 to generate measurements to be described in greater detail below. It should be emphasized that the system 10 of FIG. 1 is configured to illustrate the operation of the present invention, and should not be construed as limiting the invention to use in any particular embodiment or group of embodiments.

A portion of the output multi-channel optical signal is coupled via coupler 20 to an input of an optical receiver 30. The receiver 30 detects the multi-channel optical signal to generate a detected signal $P_{total}(t)$ indicative of the total power level of the multi-channel optical signal, and supplies the detected signal $P_{total}(t)$ to a radio frequency (RF) input of an RF mixer 32. The local oscillator (LO) input of mixer 32 receives a reference data signal from the multi-channel modulation source 14. As will be described in greater detail below, this reference data signal generally corresponds to a data signal associated with a particular channel to be monitored and controlled in accordance with the invention. The reference data signal associated with the jth channel and applied to the LO input of mixer 32 will be designated $V_{LOj}(t)$. The mixer 32 correlates the detected multi-channel signal and the reference data signal associated with a particular channel in order to generate a measure of the optical signal power of the particular channel. The mixer output voltage $V_{mix}$ may be given by:

$$V_{mix} = K \cdot Avg[V_{LOj} \cdot P_{total}(t)].$$

The mixer output $V_{mix}$ will be proportional to the modulated signal power in channel j if the following conditions hold:

$$P_{total}(t) = P_{cw} + \sum_i P_i(t), \text{ and}$$

$$Avg[P_i(t) \cdot P_j(t)] = 0 \text{ for } i \neq j$$

where $P_{cw}$ is the continuous wave (CW) output power of the multi-frequency laser 16 and i designates all channels other than the particular channel j. The CW output power $P_{cw}$ includes amplified spontaneous emission (ASE) noise and any unmodulated channel power. The relative timing of the signals $V_{LOj}$ and $P_{total}(t)$ may need to be adjusted to obtain the maximum output signal $V_{mix}$.

The mixer output voltage is fed back to a corresponding input of the multi-channel current source 12 via a feedback path which in this embodiment includes line 36, controller 38 and line 42, and is used to alter the current supplied to the multi-frequency laser 16 such that channel signal powers are maintained at desired levels. The controller 38 in the feedback control path of the exemplary embodiment of FIG. 1 operates in conjunction with a processor 40. The controller 38 receives measures of channel signal power level from mixer 32 via line 36, supplies the measures to the processor 40, and receives corresponding control signals from processor 40. The controller 38 uses the control signals from processor 40 to direct the operation of multi-channel current source 12 via line 42 such that the channel signal power levels are stabilized or otherwise maintained at desired levels. The controller 38 also directs the operation of multi-channel modulation source 14. For example, in an embodiment in which the correlation feedback process is performed sequentially on each of the channels of a multi-channel signal, the controller 38 directs the modulation source 14 to supply the data signal of a particular channel being monitored as a reference data signal to the LO port of the mixer 32 via line 34. The processor 40 may be a personal computer or other type of computer, a microprocessor, a central processing unit, an application-specific integrated circuit or any other type of digital data processor programmed to provide the feedback control functions described herein. In alternative embodiments, the controller 38 may be combined with the processor 40 and implemented as a single processing unit. The controller 38 and processor 40 may be collectively referred to herein as a feedback control processor.

The system of FIG. 1 was configured with an exemplary set of system parameters and tested to illustrate the operation of the present invention. The above-noted integrated 24-channel 1550 nm InGaAsP laser was used as multi-frequency laser 16. The laser was packaged with a thermoelectric cooler to control its operating temperature and was connectorized using a lensed fiber pigtail. Eight of the 24 channels were operated, with a channel spacing of about 200 GHz and wavelengths in the range between about 1548 and 1559.5 nm. The eight channel gain sections were each biased using a current in a nominal range between about 50 to 80 mA. Modulation data signals were supplied from the multi-channel modulation source 14 at about 40 mA peak-to-peak and were AC-coupled to the multi-frequency laser 16 using bias tees. Each of the channels was modulated by a 50 Mbit/s data signal having a different random data string about 1 Kbit in length. The random data strings were generated from a random number generator using different seed numbers for each channel. It should be noted that the present invention is also suitable for use in a broadcast application in which the same data signal is broadcast on multiple channel signals to multiple destinations. The operation of such an embodiment was tested by configuring the system of FIG. 1 such that the same data pattern was applied to each channel. The data signal applied to each successive channels was delayed relative to the data signal applied to the previous adjacent channel by one bit period, or 20 ns at a data rate of 50 Mbit/s, in order to decorrelate the broadcast data.

The exemplary system was tested using two data modulation formats, simultaneous non-return-to-zero (NRZ) modulation of all channels, and sequential return-to-zero (RZ) modulation. In the case of sequential RZ modulation, the data pulses applied to the channel modulators were selected to have a duration of about 1.6 ns and thus an 8% RZ duty cycle at a bit period of 20 ns, and were staggered in steps of about 2.5 ns to prevent pulse overlap among the channels. These and other types of sequential RZ modulation tend to reduce channel crosstalk attributable to electrical coupling and gain saturation, although generally at the expense of requiring a higher modulation bandwidth. The total fiber-coupled output power from the multi-frequency laser 16 was about −10 dBm with simultaneous NRZ modulation, and about −13 dBm with sequential RZ modulation. The coupler 20 was implemented in this exemplary embodiment such that 20% of the optical signal power was directed toward EDFA 22, while 80% of the optical signal power was coupled to the input of the receiver 30. The mixer 32 was selected to have a bandwidth of about 10 MHZ, which was sufficient to obtain useful correlation measures for the above-noted 50 Mbit/s data signals.

Figure 2:
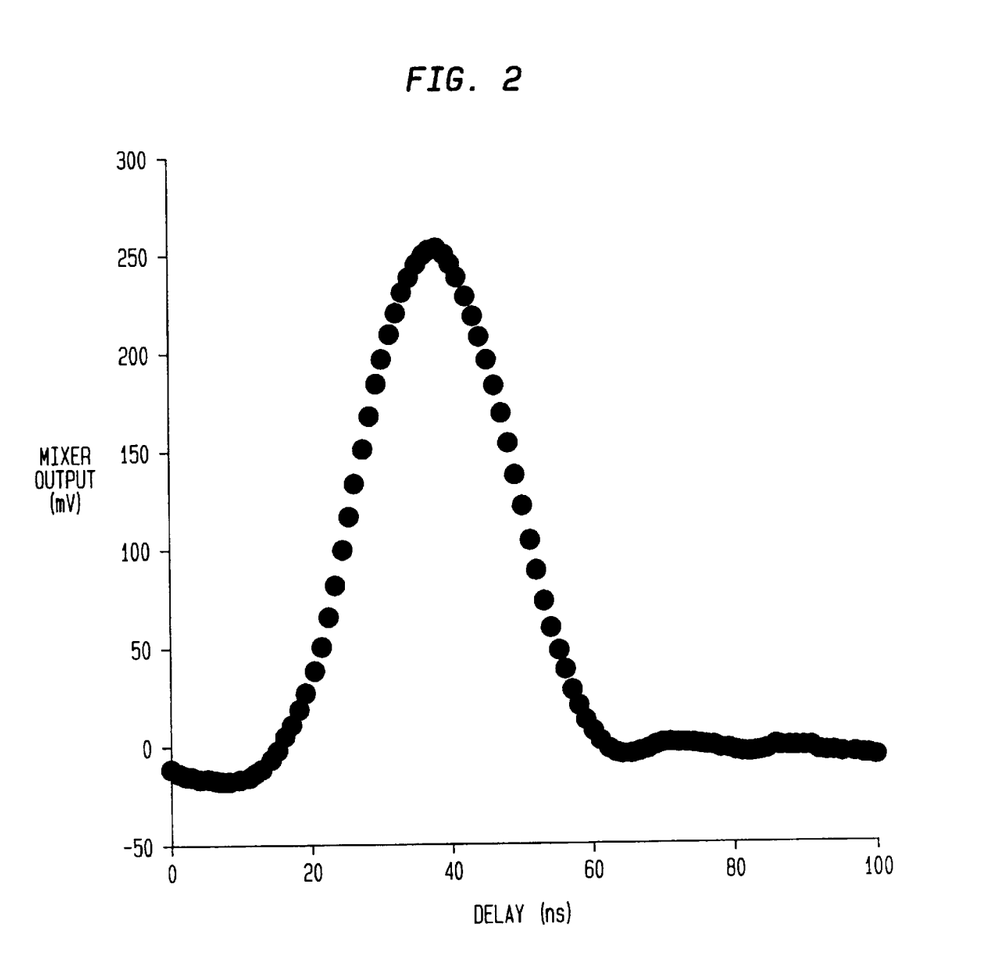
FIG. 2 is a plot of mixer output voltage as a function of relative delay of a reference data signal input in the exemplary optical system of FIG. 1.

FIG. 2 shows a plot of the mixer output voltage $V_{mix}$ as a function of reference data signal delay for a single-channel mode of operation. The plot was generated by operating the multi-frequency laser 16 with a single NRZ-modulated channel, delaying the reference data signal applied to the LO input of mixer 32 by amounts shown on the horizontal axis, and measuring the corresponding mixer output voltages $V_{mix}$ on a voltage meter 46. The plotted mixer output voltage response exhibits a shape which is characteristic of an autocorrelation function of random data signals. The voltage response has a maximum value when the reference data signal and detected channel signal are bit-synchronized, and approaches zero when the relative delay between these signals is advanced or retarded by more than one bit period, or 20 ns in this example.

Figure 3A:
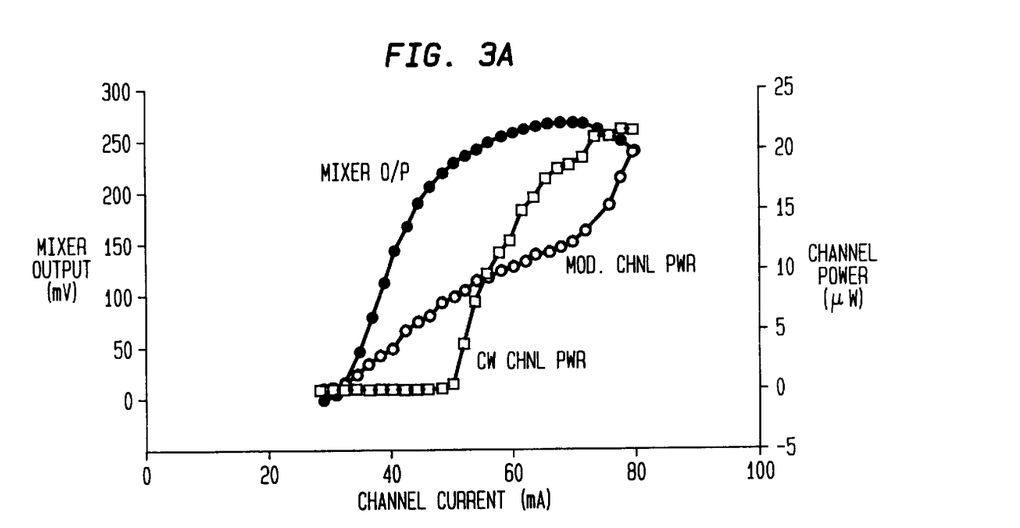
FIG. 3A shows plots of mixer output, modulated channel power and CW channel power as a function of DC current applied to bias a channel of a multi-frequency laser of the system of FIG. 1 in a single-channel mode of operation.
Figure 3B:
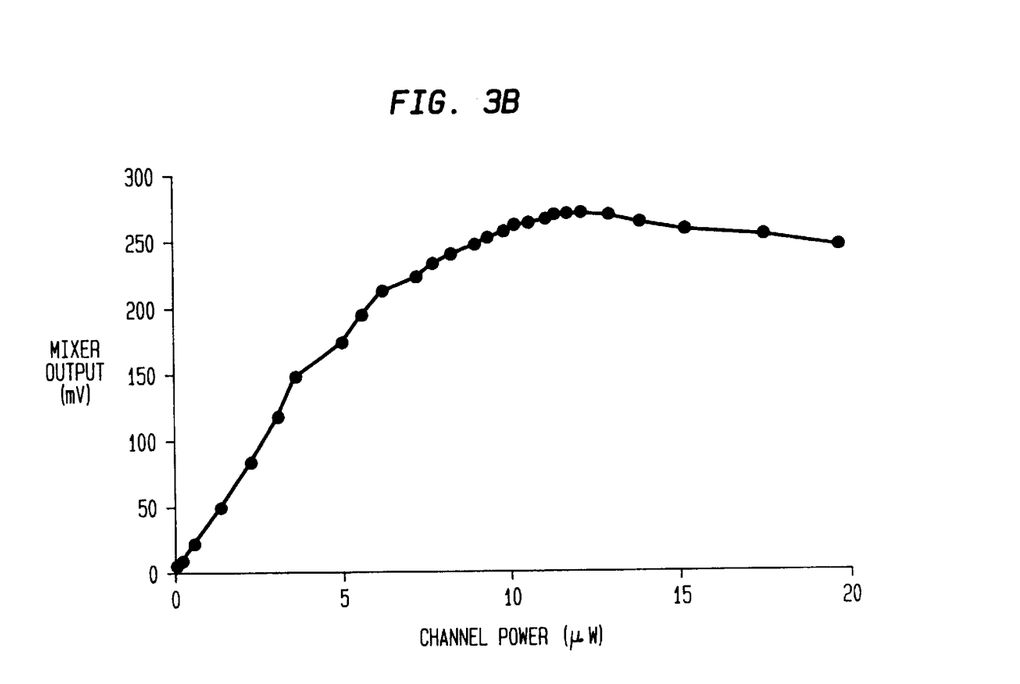
FIG. 3B is a plot of mixer output as a function of channel power in the exemplary optical system of FIG. 1 in a single-channel mode of operation.

FIG. 3A shows a plot of the mixer output, the modulated channel power and the CW channel power as a function of DC bias current applied to a channel of multi-frequency laser 16 in a single-channel mode of operation. The common output amplifier of the multi-frequency laser 16 was biased at about 150 mA. The measurements for modulated channel power and CW channel power were made in the signal path including EDFA 22. The mixer output is shown for a condition in which the delay of the reference data signal is set so as to achieve the maximum correlation as described in conjunction with FIG. 2 above. FIG. 3A indicates that the CW lasing threshold is approximately 50 mA as shown in the CW channel power plot. The apparent lasing threshold under modulation decreases to about 30 mA when the modulation signal current of 40 mA peak-to-peak is AC coupled through the bias tee as previously noted. At a channel bias current value of about 70 mA, the slope of the modulated channel power plot increases sharply as the logic zero level passes the lasing threshold, while the mixer output voltage levels off and then declines due to laser saturation. FIG. 3B is a plot of the mixer output as a function of the modulated output power of multi-frequency laser 16 in a single-channel mode of operation, under the same set of conditions used to produce the plots of FIG. 3A. It can be seen from FIG. 3B that the mixer output becomes saturated at a channel power level of about 10 $\mu$W, which corresponds to a channel bias current of about 70 mA and thus the point at which the logic zero bias level reaches the lasing threshold. Saturation of the mixer output can therefore be used in accordance with the present invention as an indicator of optimum operating currents for each of the channels of the multi-frequency laser 16.

Figure 4:
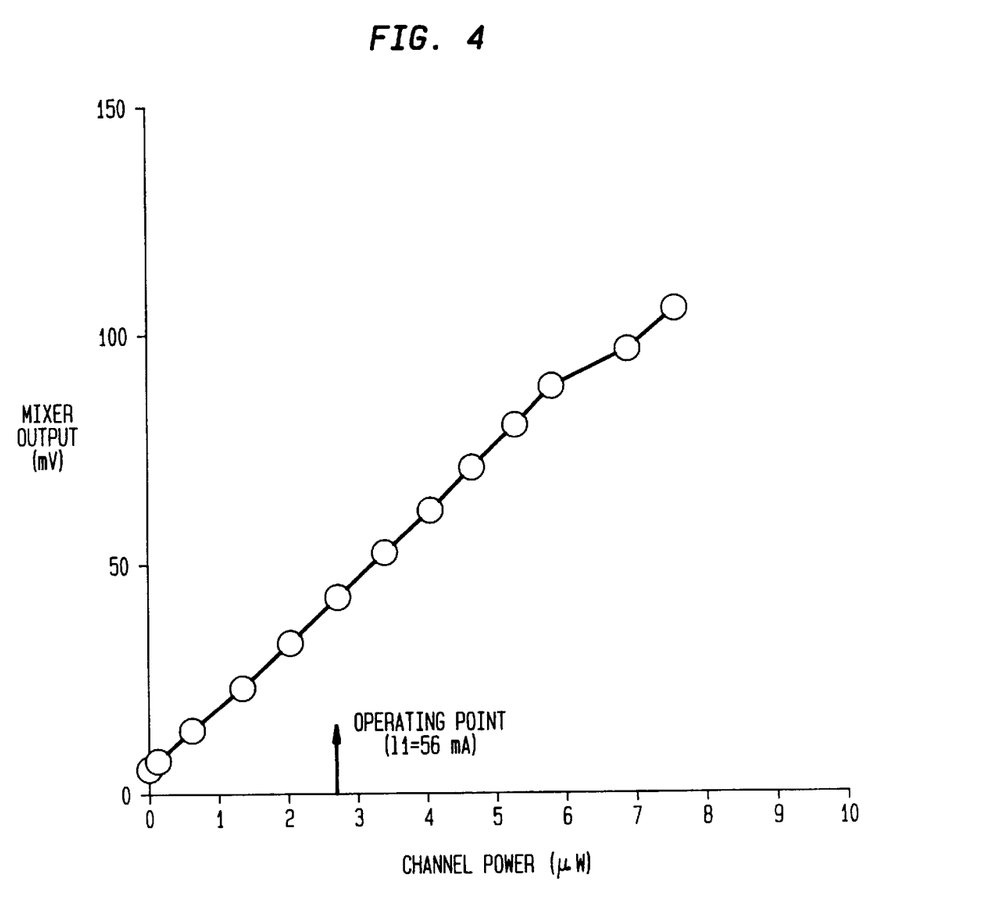
FIG. 4 is plot of mixer output as a function of channel power in the exemplary optical system of FIG. 1 for a particular monitored channel in a multi-channel mode of operation.

FIG. 4 is a plot of mixer output as a function of modulated channel power for a particular modulated channel in a mode of operation in which eight channels of the multi-frequency laser 16 are simultaneously modulated with random 50 Mbit/s NRZ data signals. The third channel of the group of eight modulated channels was selected for monitoring. Each channel was modulated with a different random sequence to minimize the cross-correlation between channels. The resulting cross-correlation values $S_{xc}$ measured by using the channel three data signal as a reference data signal and single-mode operation for each of the other channels ranged from about −0.034 to 0.056. FIG. 4 indicates that despite these cross-correlation effects, a substantially linear autocorrelation response was achieved when the mixer was used to monitor the channel three signal in the presence of the other seven modulated signals. The plotted measurements were obtained by changing the DC bias current of channel three after first setting all eight modulated channels to have equal output power at a nominal operating point. At this nominal operating point, channel three was biased with an initial bias current I1 of about 56 mA, and the corresponding channel three output power was about 2.7 $\mu$W. Variations in the channel three bias current about this operating point produced the changes in channel power and mixer output shown in the FIG. 4 plot. The linear autocorrelation response of FIG. 4 indicates that the mixer output voltage is a valid indicator of the optical signal power in a single modulated channel in the presence of interfering channels.

The system of FIG. 1 was configured in an embodiment utilizing a processor-controlled feedback loop to stabilize eight channels of the above-described multi-frequency laser 16. The operating parameters are as noted above in conjunction with FIGS. 2 through 4 unless otherwise noted. The processor-controlled feedback loop sequenced the reference data signal applied to the mixer LO input through the eight distinct modulation patterns of the eight channel signals. The bias current of the particular channel being monitored at a given time, referred to as the active channel, was adjusted to obtain a set-point mixer output voltage indicative of a desired channel power level. The feedback control was tested for both the NRZ and sequential RZ data modulation formats described previously, and for an embodiment in which each channel carried an independent data stream as well as the above-described broadcast embodiment in which each channel carried a different delayed version of the same stream. The testing was simplified by maintaining the logic zero levels of all channels at a point below the lasing threshold in order to avoid saturating the mixer output. The processor-controlled feedback loop had a step resolution of about 0.5 mA, and stabilized the mixer output voltages of all eight channels to within 5% of the corresponding set-point value after about seven iterations of current adjustment for each channel. The average adjustment period for each channel was about 3.7 seconds in this illustrative example, and was limited by the relatively low speed of the particular processor-controlled interface used to carry out the measurements. A dedicated controller could be used to reduce the adjustment period to the averaging period of the correlation measurements, which in the illustrative example was on the order of 200 msec.

Cross-correlation among the eight channels created offset errors in the mixer output voltages. The offset voltage $V_{offset}$ for a given active channel was measured by turning off the active channel after all channels were nominally equalized. The measured offset voltages for all of the channels were then used to correct the corresponding mixer output voltages after all channels were again turned on. TABLE 1 below summarizes the offset voltages measured for eight channels modulated with independent NRZ data, and the corresponding steady-state normalized channel power P measured when cycling the multi-frequency laser 16 from 15 ° C. to 20° C., back to 15° C., and then back to 20° C. The set-point mixer output voltage for all channels was about 40 mV. Similar results were obtained with broadcast NRZ data, in which case the maximum power difference of the eight channels was about 0.74 dB.

TABLE 1

| Channel No. | $V_{offset}$ (mV) | P@15° C. (dB) | P@20° C. (dB) | P@15° C. (dB) | P@20° C. (dB) |
| --- | --- | --- | --- | --- | --- |
| 1 | 16.89 | 0.83 | 0 | 1.06 | 0.14 |
| 2 | 4.98 | 0.71 | 0.83 | 0.77 | 0.49 |
| 3 | 19.24 | 0.76 | 1.06 | 1.03 | 0.47 |
| 4 | 20.07 | 1.21 | 0.43 | 1.13 | 0.66 |
| 5 | 15.53 | 0.71 | 0.23 | 0.50 | 0.57 |
| 6 | 12.44 | 1.21 | 0.72 | 1.05 | 1.15 |
| 7 | 12.58 | 0.20 | 0.49 | 1.28 | 1.25 |
| 8 | 22.07 | 0.63 | 1.23 | 0.79 | 0.81 |

The results for eight-channel stabilization with sequential RZ modulation are summarized in TABLE 2 below. The set-point voltage for the mixer output in this case was about 20 mV. With the exception of channel eight at 16° C., good uniformity in channel power was obtained. The reduced optical power in channel eight at 16° C. may be attributable to spurious lasing in shorter wavelengths exhibited by the particular multi-frequency laser used in the experiments. Unequal channel signal power levels may be attributable to differences in mixer efficiency caused by small variations in the timing between the NRZ reference data signal at the LO input of the mixer and the relatively narrow RZ pulses applied to the RF input of the mixer. These differences could be corrected using appropriate timing adjustments as the controller cycles through the channels.

TABLE 2

| Channel No. | $V_{offset}$ (mV) | P@16° C. (dB) | P@20° C. (dB) |
| --- | --- | --- | --- |
| 1 | 4.5 | 1.38 | 1.04 |
| 2 | 4.8 | 1.43 | 2.10 |
| 3 | 5.3 | 1.09 | 1.17 |
| 4 | 4.7 | 0.79 | 1.41 |
| 5 | 5.1 | 0.55 | 1.32 |
| 6 | 5.3 | −0.68 | 0.28 |
| 7 | 5.4 | 1.32 | 1.33 |
| 8 | 5.4 | −2.87 | 0 |

It can be seen from TABLES 1 and 2 above that correlation feedback in accordance with the invention compensated for temperature-induced changes in the channel signal power levels of the mutli-frequency laser. Without the feedback control loop, excursions in channel power of greater than 10 dB were observed over a 5° C. temperature range. In the exemplary processor-controlled feedback loop used to generate the above measurements, the maximum allowable temperature slew rate was less than 4° C. per minute because of the slow cycling of the control sequence. This effect was tested by adjusting the laser temperature controller first from 15° C. to 20° C. at a slew rate of 25° C. per minute, then from 20° C. to 15° C. at a slew rate of −4° C. per minute, and observing the resulting power excursions in each channel. These temperature-induced channel power fluctuations are summarized in TABLE 3 below.

TABLE 3

| Channel No. | Power Variation @−4° C./min (dB) | Power Variation @25° C./min (dB) |
| --- | --- | --- |
| 1 | 1.68 | 4.39 |
| 2 | 1.45 | 3.23 |
| 3 | 0.94 | 4.90 |
| 4 | 1.72 | 4.14 |
| 5 | 2.34 | 7.06 |
| 6 | 2.46 | 4.19 |
| 7 | 2.24 | 4.22 |
| 8 | 1.97 | 5.48 |

Figure 5A:
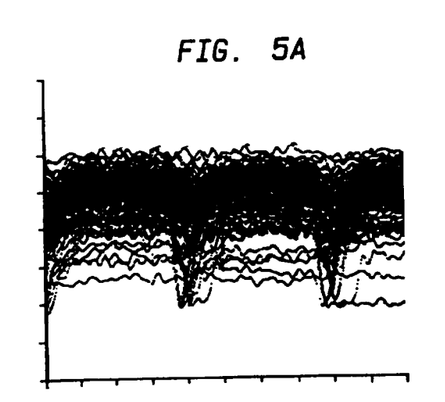
FIGS. 5A–5D show exemplary output signals and eye patterns as functions of time as measured in an exemplary eight-channel optical system with correlation feedback in accordance with the present invention.
Figure 5B:
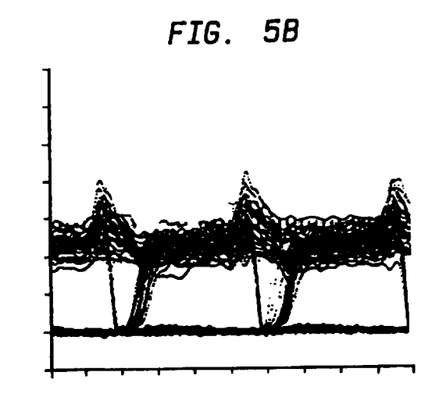

In addition to the measurements summarized in TABLES 1, 2, and 3 above, the exemplary eight-channel multi-frequency laser stabilized with correlation feedback was tested for bit-error-rate performance and output eye patterns using both NRZ and sequential RZ modulation. Substantially error-free performance was achieved with both modulation formats. FIGS. 5A through 5D show output signals and eye patterns as functions of time for the exemplary eight channel multi-frequency laser with correlation feedback in accordance with the present invention. FIG. 5A shows an NRZ-modulated multi-channel signal at the output of the multi-frequency laser. FIG. 5B shows a representative eye pattern of a single filtered channel signal at an output of the AWGR 24 of FIG. 1. FIG. 5B indicates the presence of significant turn-on delay due to the below-threshold operation used in the illustrative measurements, as well as crosstalk resulting from the common output stage amplifier in the exemplary multi-frequency laser. It is expected that the turn-on delay could be reduced in other embodiments by operating at or above the lasing threshold. Techniques for reducing the crosstalk effects are described in, for example, C. R. Doerr et al., "Elimination of Signal Distortion and Crosstalk from Carrier Density Changes in the Shared Semiconductor Amplifier of Multifrequency Signal Sources," IEEE Photonics Technology Letters, Vol. 7, p. 1131, 1995, which is incorporated herein by reference.

Figure 5C:
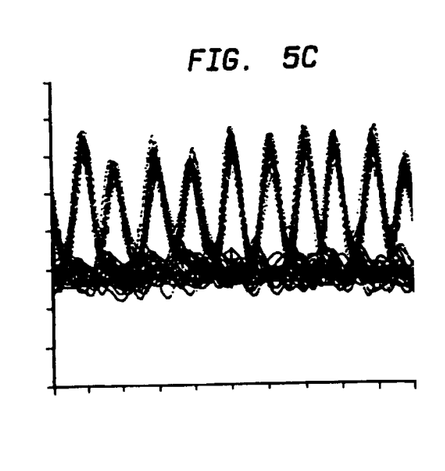
Figure 5D:
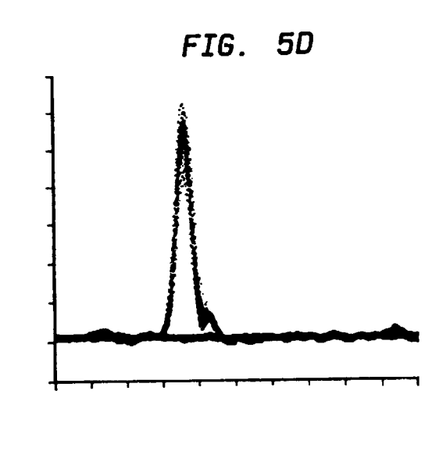

FIG. 5C shows a multi-channel signal at the output of the multi-frequency laser for the case of sequential RZ modulation. The power level differences apparent in FIG. 5C may be attributed to the above-noted timing variations resulting from the application of narrow RZ pulses to the mixer 32. FIG. 5D shows a representative eye pattern of a single filtered channel signal at an output of the AWGR 24 of FIG. 1. It can be seen from FIG. 5D that there is no significant inter-channel crosstalk when sequential RZ modulation was used in the exemplary eight-channel optical system.

The present invention utilizes correlation feedback to stabilize or otherwise control power levels of multiple channel signals generated by a multi-channel optical source. In the exemplary embodiments described above, an eight-channel integrated multi-frequency laser transmitter was stabilized for cases in which the channels carried independent data streams as well as broadcast data streams. An RF mixer was used as a correlator to derive a voltage proportional to the signal power level in each optical signal channel. This voltage was then used in a processor-controlled feedback control loop to stabilize the channel signal power levels. It was previously noted that the channel data signals should be configured such that the channel cross-correlation is weak. As noted above, this may be accomplished by providing independent data streams for each channel, or by providing a delay of one bit period or more between versions of a common broadcast data stream applied to multiple channels in a broadcast application. Longer correlation times could also be used to reduce the cross-correlation error. In addition, binary correlators such as the Harris Semiconductor HSP45256 binary correlator could be used to generate real-time corrections to the mixer output voltage in order to compensate for the cross-correlation error.

Alternative embodiments of the invention may utilize other types of correlators to generate measures of channel signal power level for use in correlation feedback. For example, the above-described RF mixer may be eliminated in an embodiment in which sampled auto-correlation is measured based on unique identification codes associated with each channel signal. Such an embodiment would be particularly well-suited for use in an application in which long sequences of repetitive data may be sent. Each channel could be framed with a unique identification code in the form of a bit pattern generated from a set of orthogonal vectors. Correlations between the orthogonal vectors and the transmitter output could then be measured using a high-speed analog multiplier with its output sampled by an analog-to-digital converter. The matrix A shown below illustrates an exemplary set of orthogonal vectors which may be used to generate unique identification codes for eight channel signals. Each row of the matrix A may be used to generate a unique bit pattern.

$$A = \begin{bmatrix} 1 & -1 & -1 & -1 & -1 & 1 & 1 & 1 \\ -1 & 1 & -1 & -1 & 1 & -1 & 1 & 1 \\ -1 & -1 & 1 & -1 & 1 & 1 & -1 & 1 \\ -1 & -1 & -1 & 1 & 1 & 1 & 1 & -1 \\ -1 & 1 & 1 & 1 & 1 & -1 & -1 & -1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \end{bmatrix}$$

The matrix A is written in bipolar form in order to show more clearly that the inner product of any two rows is zero, such that orthogonal identification codes can be generated from the rows. The matrix A also provides identification codes having an equal density of marks and spaces, corresponding in this example to the respective 1 and -1 entries in each row of matrix A, such that other types of input noise associated with the codes will tend to average to zero at the output of the analog multiplier. The use of identification codes in this manner could be used to simplify the implementation of correlation feedback in, for example, a data regenerator in which the correlation sequences could be locally synthesized rather than recovered from each of the channels. It should be noted that the correlation feedback techniques of the present invention could be implemented using any of a number of other alternative correlation techniques as appropriate for the data signal and performance requirements of a given application.

The above-described embodiments of the invention are intended to be illustrative only. Numerous other alternative embodiments may be devised by those skilled in the art without departing from the scope of the following claims.

What is claimed is:

1. A method of controlling optical signal power level in an optical system, the method comprising the steps of:
   correlating a detected multi-channel optical signal with a data signal which modulates a particular channel of the multi-channel optical signal in order to generate a measure of the optical signal power of the particular channel; and
   utilizing the measure to control an optical signal power level of the particular channel.

2. The method of claim 1 wherein the step of utilizing the measure to control a power level in the channel further includes the step of supplying the measure as a feedback signal to a feedback control processor.

3. The method of claim 2 wherein the feedback control processor generates a control signal which is applied to a current source associated with the particular channel in order to adjust the optical signal power level of the channel.

4. The method of claim 1 wherein the step of correlating a multi-channel optical signal with a data signal associated with a particular channel further includes the step of applying a detected version of the multi-channel optical signal and the particular channel data signal to respective first and second inputs of a mixer.

5. The method of claim 4 wherein the first and second inputs of the mixer correspond to respective RF and LO inputs of the mixer.

6. The method of claim 1 wherein the step of correlating a multi-channel optical signal with a data signal of a particular channel to generate a measure of the optical signal power of the particular channel further includes the step of correlating the multi-channel optical signal with a data signal in the form of a unique channel identifier associated with the particular channel.

7. The method of claim 6 wherein the step of correlating the multi-channel optical signal with a data signal in the form of a unique channel identifier associated with the particular channel further includes the step of multiplying the multi-channel optical signal and the unique channel identifier.

8. The method of claim 6 wherein the unique channel identifier is configured to include an equal number of values of each of two logic levels.

9. The method of claim 6 wherein unique channel identifiers associated with each of a plurality of channels of the multi-channel signal are configured such that the identifiers correspond to a set of orthogonal vectors.

10. An apparatus for controlling optical signal power level in an optical system including a multi-channel optical signal source, the apparatus comprising:

a correlator having a first input connected to receive a detected multi-channel optical signal generated by the multi-channel optical signal source, and a second input connected to receive a data signal which modulates a particular channel of the multi-channel optical signal wherein the correlator is operative to correlate the detected multi-channel optical signal and the particular channel data signal in order to provide an output corresponding to a measure of the optical signal power of the particular channel; and a feedback control processor having an input connected to receive the measure from the correlator, and operative to utilize the measure to control an optical signal power level of the particular channel.

11. The apparatus of claim 10 wherein the feedback control processor is operative to utilize the measure to generated control signal which is applied to an input of a current source supplying current to the multi-channel signal source.

12. The apparatus of claim 10 wherein the correlator further comprises a mixer having a first input connected to receive the detected multi-channel optical signal and a second input for receiving the particular channel data signal.

13. The apparatus of claim 12 wherein the first and second inputs of the mixer correspond to respective RF and LO inputs of the mixer.

14. The apparatus of claim 10 wherein the correlator is operative to correlate the detected multi-channel optical signal with a data signal by multiplying it with a data signal in the form of a unique channel identifier associated with the particular channel.

15. The apparatus of claim 14 wherein the unique channel identifier is configured to include an equal number of values of each of two logic levels.

16. The apparatus of claim 14 wherein unique channel identifiers associated with each of a plurality of channels of the multi-channel signal are configured such that the identifiers correspond to a set of orthogonal vectors.

17. An optical system comprising:

a multi-channel optical signal source;

a receiver having an input coupled to an output of the signal source, the receiver detecting a multi-channel optical signal generated by the multi-channel optical signal source;

a correlator having a first input connected to receive a detected multi-channel optical signal from the receiver, and a second input connected to receive a data signal which modulates a particular channel of the multi-channel optical signal, wherein the correlator is operative to correlate the detected multi-channel optical signal and the particular channel data signal in order to provide an output corresponding to a measure of the optical signal power of the particular channel; and a feedback control processor having an input connected to receive the measure from the correlator, and operative to utilize the measure to control an optical signal power level of the particular channel.

18. The system of claim 17 wherein the feedback control processor is operative to utilize the measure to generate a control signal which is applied to an input of a current source supplying current to the multi-channel signal source.

19. The system of claim 17 wherein the correlator further comprises a mixer having a first input connected to receive the detected multi-channel optical signal and a second input for receiving the particular channel data signal.

20. The system of claim 17 wherein the correlator is operative to correlate the detected multi-channel optical signal with a data signal by multiplying it with a data signal in the form of a unique channel identifier associated with the particular channel.

21. The system of claim 20 wherein the unique channel identifier is configured to include an equal number of values of each of two logic levels.

22. The system of claim 20 wherein unique channel identifiers associated with each of a plurality of channels of the multi-channel signal are configured such that the identifiers correspond to a set of orthogonal vectors.

* * * * *